United States Patent [19]
Fredlund et al.

[11] Patent Number: 5,815,645
[45] Date of Patent: Sep. 29, 1998

[54] METHOD OF COMBINING TWO DIGITAL IMAGES

[75] Inventors: John Randall Fredlund; Ronald Steven Cok, both of Rochester, N.Y.

[73] Assignee: Eastman Kodak Company, Rochester, N.Y.

[21] Appl. No.: 681,755

[22] Filed: Jul. 29, 1996

[51] Int. Cl.⁶ .................................................. G06K 15/00
[52] U.S. Cl. ........................ 395/117; 358/450; 358/540
[58] Field of Search ........................... 395/117; 358/450, 358/518, 527, 540; 382/162; G06K 15/00

[56] References Cited

U.S. PATENT DOCUMENTS

| | | | |
|---|---|---|---|
| 5,028,993 | 7/1991 | Hobori et al. | 358/75 |
| 5,068,690 | 11/1991 | Nakatami et al. | 358/218 |
| 5,105,469 | 4/1992 | MacDonald et al. | 382/162 |
| 5,185,666 | 2/1993 | Capitant et al. | 358/183 |
| 5,396,594 | 3/1995 | Griffith et al. | 395/164 |
| 5,459,819 | 10/1995 | Watkins et al. | 315/117 |
| 5,487,020 | 1/1996 | Lovenheim | 354/76 |

FOREIGN PATENT DOCUMENTS 459711  12/1991  European Pat. Off. .

OTHER PUBLICATIONS

Sim, Fraser "The Quantel Paint Box—The Ultimate TV Graphic System" 626 British Kinematography Sound & Television Society Journal 66 (1984).

*Primary Examiner*—Thomas L. Stoll
*Attorney, Agent, or Firm*—Frank Pincelli; David A. Novais

[57] ABSTRACT

A method of combining at least one customer generated digital image to form a merged image and/or text with at least one prestored digital image. The prestored digital image has a predetermined location where the customer generated digital image may be placed. A design characteristic is determined from an item to be associated with the merged image. The customer generated digital image or the prestored digital image is modified in accordance with the design characteristic so as to form a first modified digital image that is then combined with the other of the customer generated digital image or the prestored digital image so as to form a newly merged digital image. The newly merged digital image is the merged image sent to an output device for printing. Alternatively, a product to be used with or associated with the merged image is automatically selected in accordance with predetermined color relationship with respect to the color of the customer generated image, the prestored digital image and/or merged digital image.

14 Claims, 8 Drawing Sheets

METHOD OF COMBINING TWO DIGITAL IMAGES

FIELD OF THE INVENTION

This is directed to a system and method for producing customized images and merging at least two images obtained from different sources and printing the images on at least one output format.

BACKGROUND OF THE INVENTION

It is known from U.S. Pat. No. 5,459,819 that digital images may be merged together so as to provide a single new merged digital image. It is also known from this patent that the images may be modified with respect to each other, for example, the color of one image may be incorporated into that of the other image. However, a problem with simply selecting colors and modifying them is that they may not produce an overall aesthetic appearance. While some people have very good abilities in color matching or selection of colors that may be used next to each other, other individuals lack this ability. Thus, the modified image may not be visually appealing by itself. Further, when the merged image is mounted with a colored matte and/or frame, an overall different visual effect may result. Additionally, these images are placed in rooms that have a particular decor.

An image that is visually unappealing is of little or no value to the customer who will most likely ask to have the image redone. Since merging of the images typically involves an operator, the customer or operator must absorb the additional time and expense. Because of the expense of the operator and the cost of equipment, it is important that the amount of time and effort used by the operator be minimized in composing of the image. The foregoing presents a very undesirable business situation where neither the customer or business person is satisfied with the aesthetic appearance of the merged image.

Thus, there is a need to provide a method and system that can quickly and easily produce a high quality visually aesthetic product.

The method and system according to the present invention solves the foregoing problems by allowing for the incorporation of design attributes obtained from items which would be located near where the merged image is to be placed. Additionally, the present invention provides means for analyzing the color content and/or graphic elements of external items and appropriately matching the color to that of the merged image. The present invention also allows the customer generated image and/or the combined image to be analyzed for color content and coordinates the color of the frame automatically in accordance with predetermined criteria. Thus, a much more aesthetically appealing product is provided to the customer.

SUMMARY OF THE INVENTION

In one aspect of the present invention there is provided a method of combining at least one customer generated digital image and/or text with at least one prestored digital image, comprising the steps of:

a) selecting a prestored digital image, the prestored digital image having one or more predetermined locations where a customer generated digital image and/or text may be placed;

b) obtaining at least one customer generated image in digital form;

c) obtaining a design characteristic from an item;

d) modifying the customer generated digital image or the prestored image in accordance with the design characteristic so as to form a first modified image; and e) combining the first modified image with the selected prestored image and/or the one customer generated digital image so as to form a newly merged digital image.

In another aspect of the present invention there is provided a method of combining at least one customer generated digital image and/or text with a prestored digital image, comprising the steps of:

a) selecting a prestored digital image, the prestored digital image having one or more predetermined locations where a customer generated digital image and/or text may be placed;

b) providing at least one capture means for obtaining at least one customer generated digital image in digital form;

c) selecting an item to be used or associated with a merged digital image, the merged digital image comprising the combination of the prestored image and the customer generated digital image; and d) analyzing the color of the customer generated digital image and/or prestored image and automatically matching the color of the item to the customer generated digital image, the prestored image and/or merged digital image.

DESCRIPTION OF THE DRAWINGS

In the detailed description of the preferred embodiment of the invention as presented below, reference is made to the accompanying drawings, in which.

DETAILED DESCRIPTION OF THE INVENTION

Figure 1:
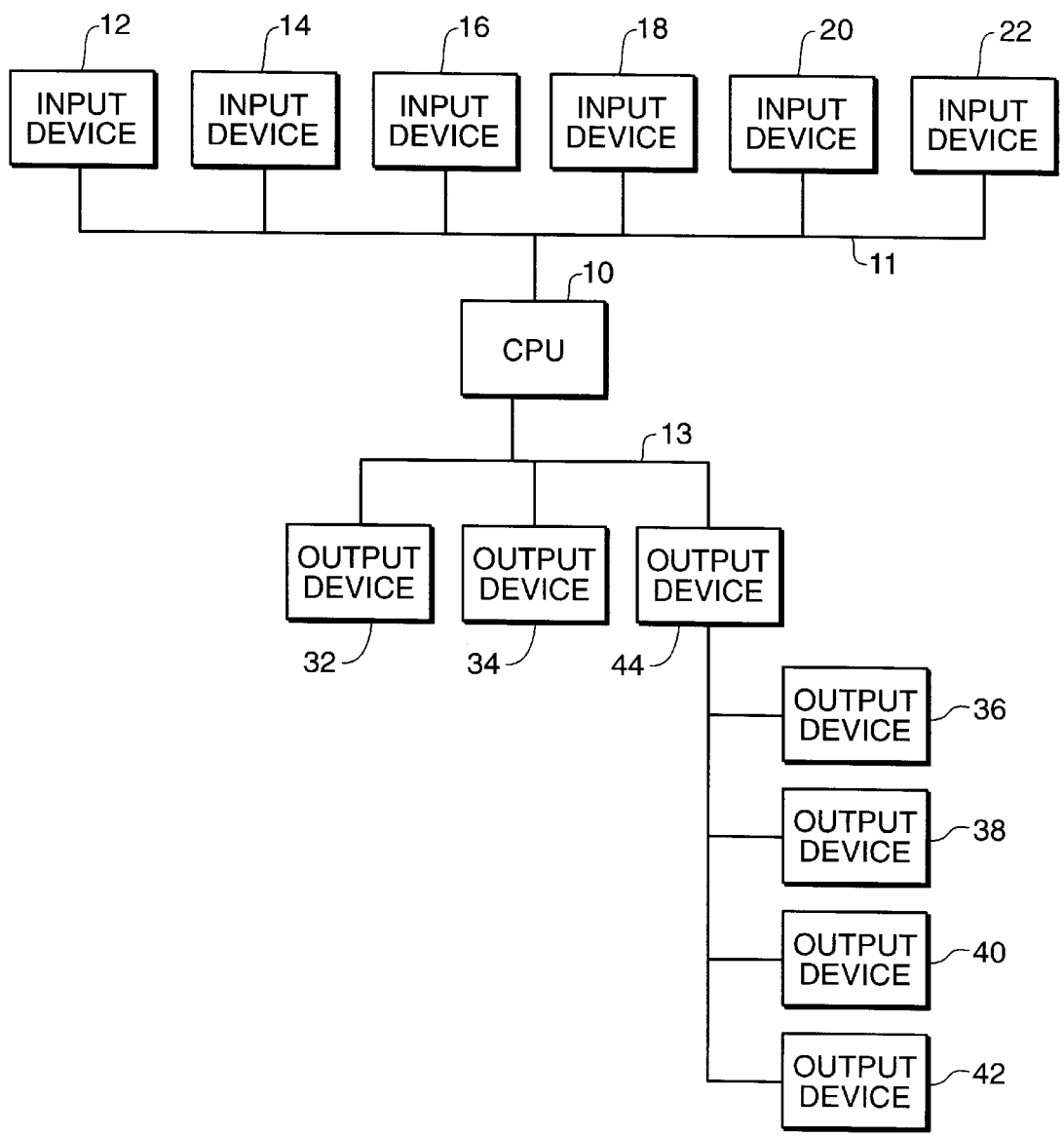
FIG. 1 is a schematic block diagram of a system made in accordance with the present invention.

FIG. 1 illustrates in block diagram form a system for producing customized images and imprinting these customized images onto a variety of different formats. In particular, the system includes a central processing unit (CPU) 10 that can take the form of any appropriate computer. In the particular embodiment illustrated, the central processing unit 10 comprises an Apple Macintosh Computer that is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output that is forwarded onto the central processing unit 10 by an appropriate data link system 11 for storage in memory and further manipulation. Likewise, input device 14 is provided for scanning photographic pictures, printed or drawn, color and/or monochrome, and producing a digitized signal that represents the image scanned. The Kodak Image Magic Heavy Stock Printer, sold by the Eastman Kodak Company, has a scanner therein that is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image or other design attribute from various sources. In particular, input device 16 is a video camera (wherein the output is digitized), and input device 18 comprises a CD (compact disc) reader for reading digitally stored information on a compact disc. Input device 20 comprises an electronic camera such as the DCS 200 Digital Camera, produced by the Eastman Kodak Company. Input device 22 may be any other input device that is capable of providing a digital signal representative of an image to the CPU, for example, video tape, video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, the data link system 13 may comprise an Ethernet data link system. The output device 32 for instance comprises a electrophotographic printer such as the Coloredge Printer, sold by the Eastman Kodak Company, which takes the digital image and transfers the digital onto media which can then be used to produce transfers for use on garments. The output device 34 in the embodiment illustrated is a cathode-ray tube printer (CRT), in particular, the PCD 600 Printer, produced by the Eastman Kodak Company, which focuses a digital image that is displayed on a cathode-ray tube on photographic paper. The output device 36 is a thermal printer for printing digital images onto thermal media. An example of a suitable thermal printer is the XLS 8600 Digital Thermal Color Printer, sold by the Eastman Kodak Company. Output device 38 can be a thermal printer for providing transfers for use on T-shirts, and output device 40 can be a thermal printer for providing transfers for placement on mugs. The last output device 42 illustrated is an inkjet printer that can be used to imprint the merged image on greeting cards and the like. Various other output devices may be provided for transferring onto various other formats such as, garments, mugs, posters, banners, life-size cut-outs, holographic and 3-D imaging, balloons, pens and pencils.

In the preferred embodiment illustrated, a server 44, such as the Power PC Apple Macintosh Computer, is provided for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also, it is to be understood that any type suitable printing device may be employed for producing the image in the desired format, the present invention not being limited by the printing devices described herein.

It is to be understood that the CPU 10 may be provided with a monitor for viewing various screens for indication of the status of the system and available options for controlling and/or operating the system as is customarily done in the prior art. The CPU is also provided with an appropriate input device such as a keyboard, touchscreen, or pointing device as are well known in the prior art for allowing the operator to properly operate the system. Thus, the user, which may be the operator and/or customer, can also view the various digital images being input into the system and generated by the system so that the appropriate selections can be made by the user and/or customer. CPU 10 stores a plurality of prestored digital images that may comprise a variety of artistic themes each having at least one location for receiving a customer generated digital image. Any one of these prestored digital images may be selected and digitally merged with the customer generated digital image(s) captured by any of the input devices 12,14,16,16,20,22.

A more detailed description of the operation of the system disclosed in FIG. 1 is described in U.S. Pat. No. 5,459,819, which is hereby incorporated by reference in its entirety.

Figure 2:
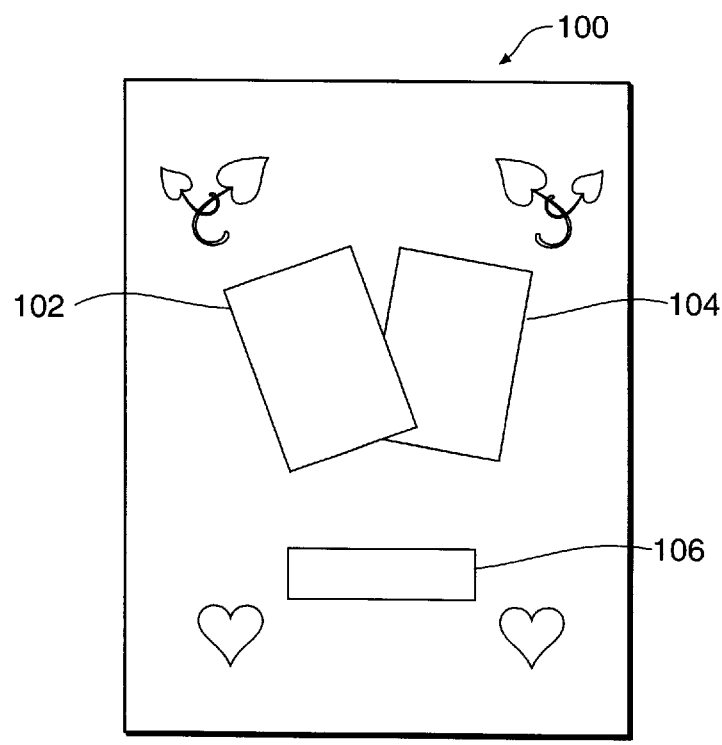
FIG. 2 is a front elevation view of a prestored digital image which has three locations for receiving customer generated images and/or text.
Figure 3A:
FIGS. 3a, 3b, and 3c illustrate two customer generated digital images and one text that is to be merged with the prestored image of FIG. 2.
Figure 3B:
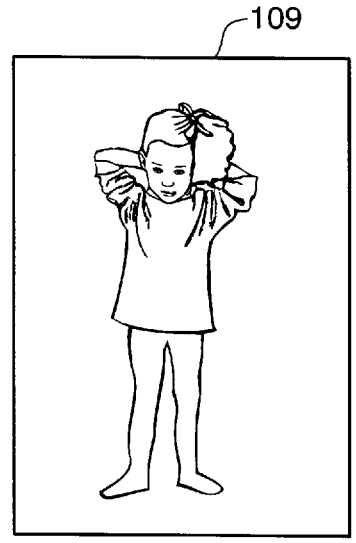
Figure 3C:
Figure 4:
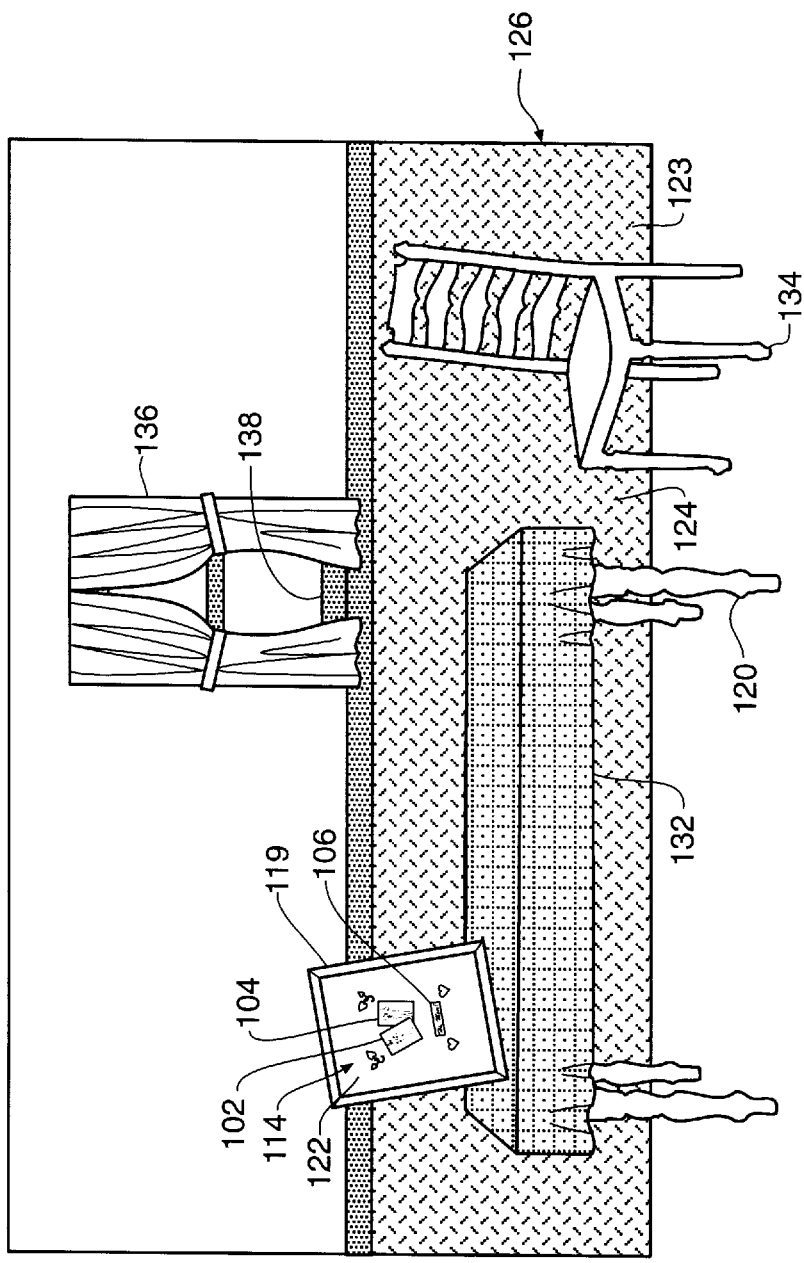
FIG. 4 is a front elevation view illustrating the merged digital image of FIGS. 2, 3a, 3b, and 3c located at a place where the merged image is to be viewed.

FIG. 2 illustrates a plan view of a prestored digital image 100 having a plurality of discrete locations 102,104,106 of a predetermined size and shape. These locations are designed to received a customer generated digital image and/or text. In the particular embodiment illustrated, locations 102,104 are designed to receive customer generated digital images, whereas location 106 is designed to receive text in digital form. FIGS. 3a, 3b and 3c illustrate customer generated digital images 108,109 which are to be placed in locations 102,104, respectively, and text 110 which is to be placed at location 106. When the prestored digital image 100 is merged with the customer generated digital images and/or text 108,109,110, the merged image 114 is formed as illustrated in FIG. 4 and is placed at the location where it is to be viewed, for example, a room. In the particular situation illustrated in FIG. 4, the merged image 114 is mounted in a frame 119 and placed on a table 120. However, it is to be understood that the mounted merged image 114 may be placed on the wall or any other location desired. While the mounted merged image 114 when viewed by itself may be visually appealing, it does not typically have any visual continuity with the room, nor blend very well with the motif of the room. Applicants have found that the overall value and warmth of the merged image 114 can be enhanced by incorporating some of the design attributes of the location and/or surrounding items where it is to be viewed into the merged image 114 to form a newly merged image. In particular, the background 122 from the the prestored digital image can be modified to incorporate a design attribute or item found in the location.

Figure 5:
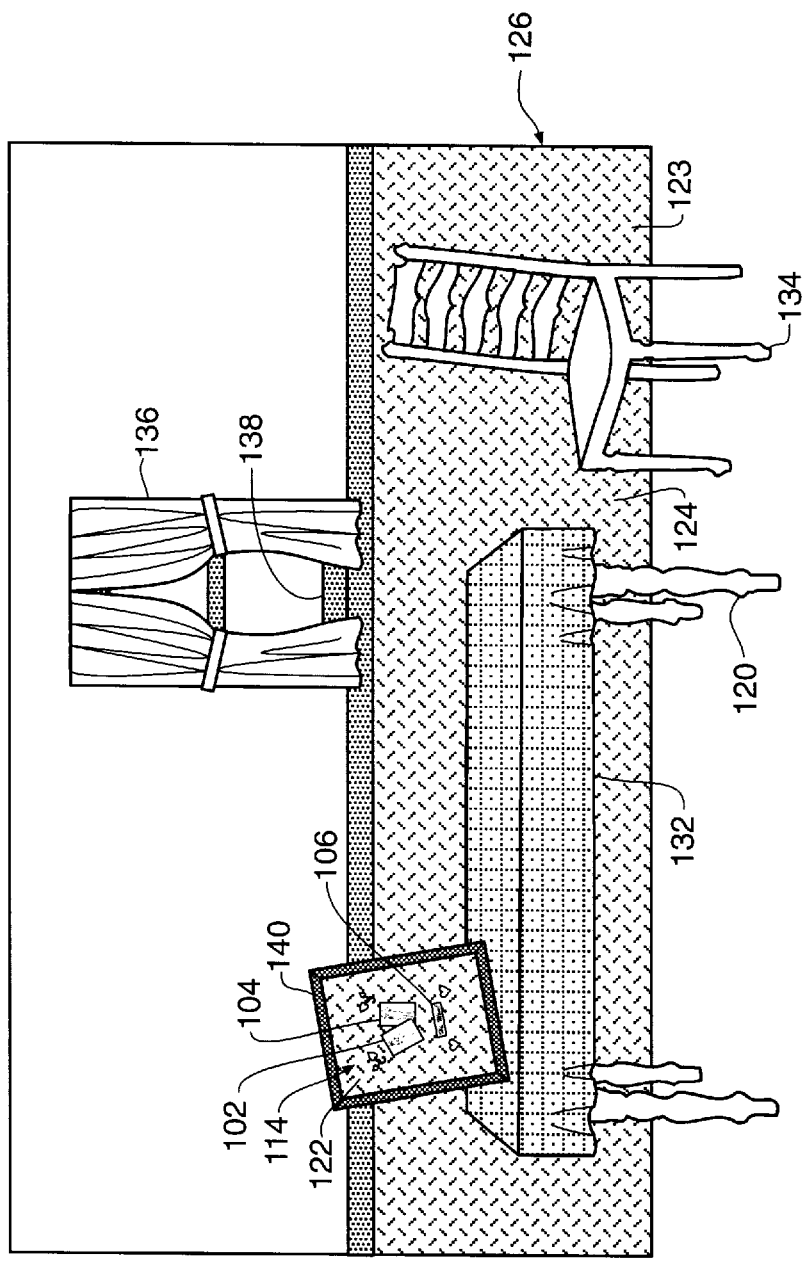
FIG. 5 is a view similar to FIG. 4 illustrating a merged image made in accordance with the present invention.
Figure 6:
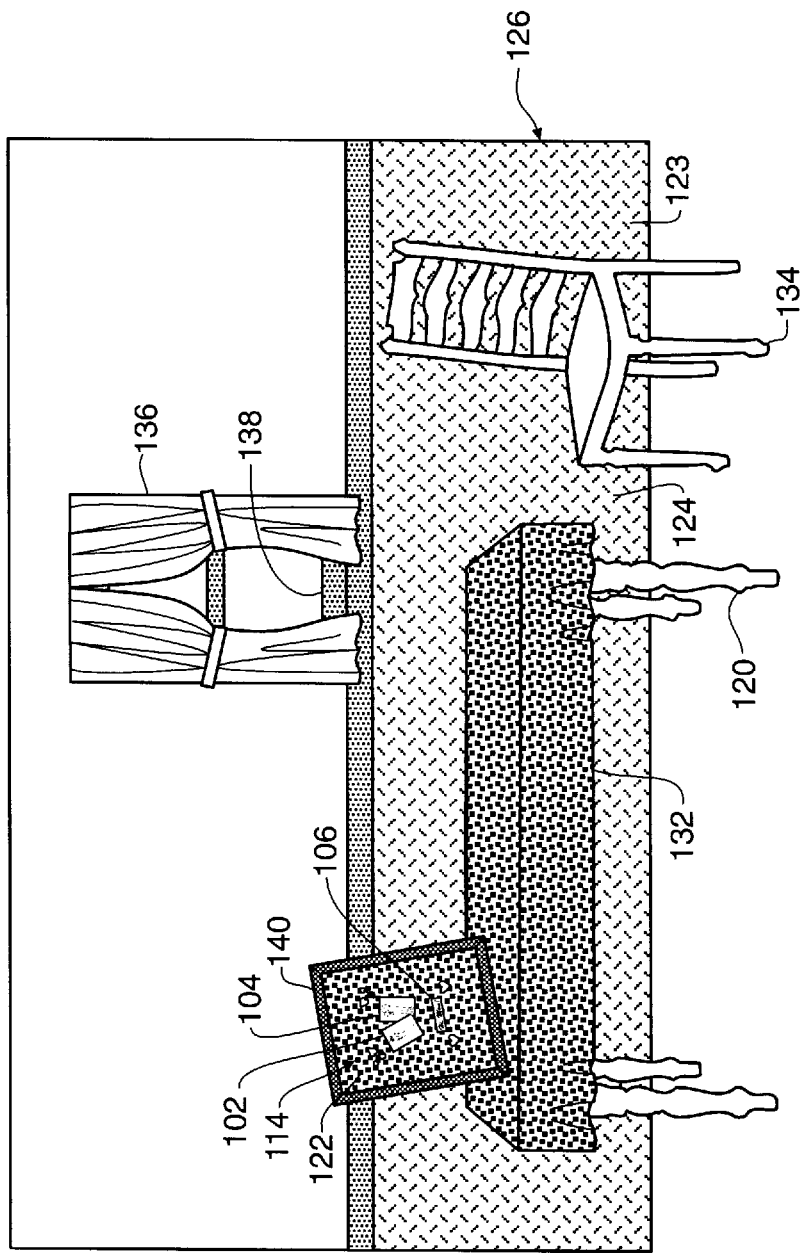
FIG. 6 is a view similar to FIG. 5 illustrating a second merged digital image made in accordance with the present invention.

FIG. 5 illustrates a modified, merged image 114 wherein the background 122 of the merged image 15 modified to incorporate the color and pattern of the wallpaper 123 located at the lower half 124 of the wall 126. This is accomplished by taking a piece of the wallpaper 123, and scanning it with a digital scanner. A suitable scanner is the Scanjet Scanner, sold by the Hewlett-Packard Company. The information obtained by the scanner is passed onto the CPU 10 of the system where it is placed into the background of the prestored digital image. While in the particular embodiment the pattern of the lower half of the wall 126 is placed into the background, various other design attributes of the location may be incorporated, including, for example, but not by way of limitation, the pattern and/or color of the tablecloth 132, the pattern and/or color of the chair 134, the pattern and/or color of the drapes 136, or pattern and/or color of the wood trim 138. It is, of course, understood that any other design attribute of the location may be selected, including the color frame 140 or a matte in which the merged image is to be mounted. FIG. 6 illustrates the background of the merged image incorporating the pattern of the tablecloth 132.

Figure 7:
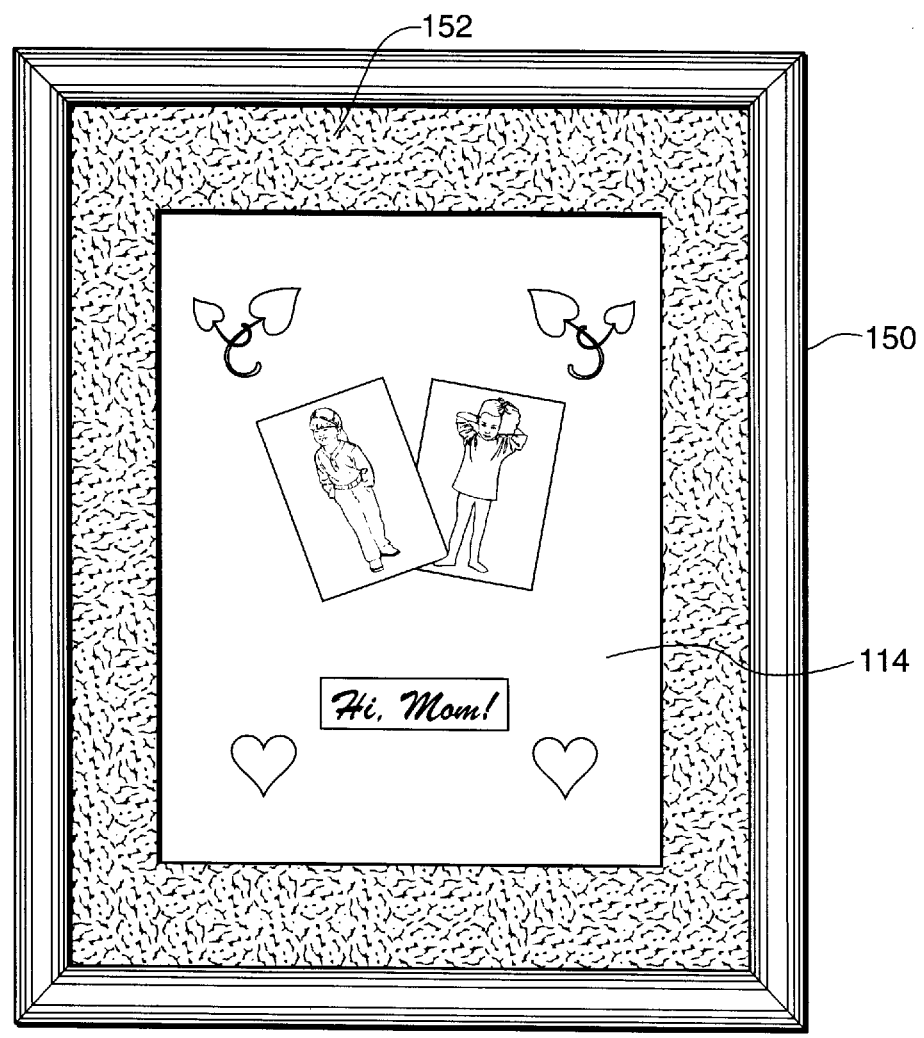
FIG. 7 illustrates a merged digital image as mounted in a matte and frame of a predetermined color which were determined in accordance with the present invention.
Figure 8:
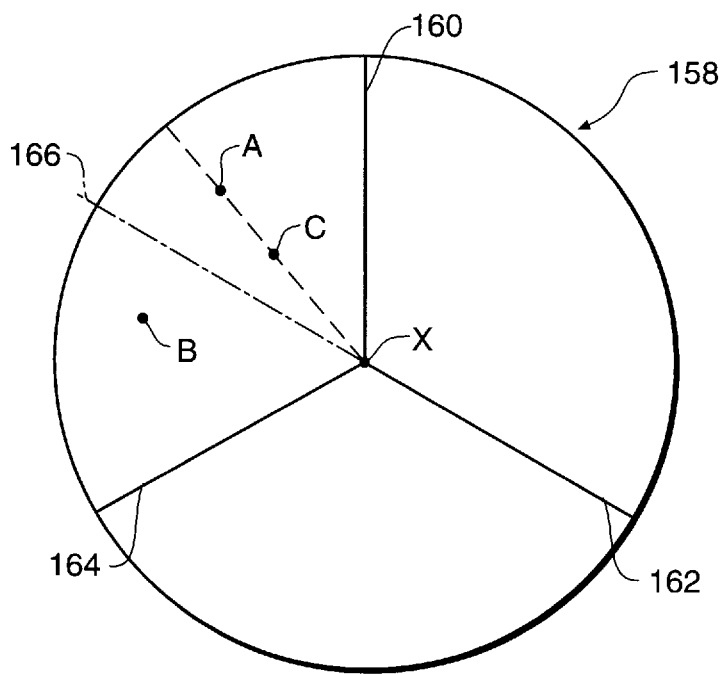
FIG. 8 is diagram of a color wheel that illustrates how a color can be automatically selected to complement or match the color analyzed on the prestored or customer generated digital image.

In the embodiments illustrated in FIGS. 5 and 6, substantially the same color and/or pattern is incorporated into the merged image. However, a contrasting color can be automatically determined and incorporated into the merged image. For example, when the digital merged image 114 is mounted in a frame 150 having a matte 152, as illustrated in FIG. 7, a contrasting color can be determined for selecting the frame 150 and/or matte 152. The digital merged image 114 as a whole, or the individual customer generated digital images 108,110, can be digitally scanned for color content to obtain a color component value or design attribute. This color component value or design attribute can be matched automatically so as to provide an appropriate balance between the color within the frame and that of the images within the merged digital image. While the drawings of the present application are not able to clearly illustrate this, if the digital merged image has many earth tone-type colors, browns or other similar type colors, then a contrasting color would be appropriately selected by a preprogrammed software placed in the CPU 10 so that an appropriate color frame can also be matched. The customer can select whether the frame should be wood or metal, or whether or not wood grains are desired in the frame of not. The particular selection of the color for the frame and/or matte is selected by the computer by an appropriate analysis and preselected color relationships.

FIG. 9 illustrates a color wheel chart 158 where the three primary colors are shown. The circumferential position of any one point represents a shade of color, and the lines 160,162,164 each indicate the primary colors cyan, magenta and yellow, respectively. The areas between lines 160, 162, 164 indicate variations in color. The distance from the center axis X represents the intensity of the color, the center representing the darkest intensity, and the outer periphery the lightest intensity. For example, if the customer generated digital image is scanned and it is determined to have an overall color content at point A, then this color is automatically selected for use on the matte, frame, or in the prestored image. If a contrasting color is desired then a color such at point B is automatically selected. Point B has the same color intensity as point A, but is spaced equi-distant from the center-line 166 between primary color lines 160,164. Alternatively, if the same color is desired, but with a greater intensity, the color at point C is automatically selected. These relationships, or any other desired relationship, can be prestored in the computer such that desired color relationship can be automatically selected. Optionally, it is possible to record this information onto a computer diskette or into computer memory. The customer can first view these combinations on a CRT screen or other display device wherein the proposed selected combinations of matte and frame are illustrated in the actual color selected. Then the user can either agree or disagree with the proposed selections.

It is to be understood that various other changes and modifications may be made without departing from the scope of the present invention. The present invention being limited by the following claims.

Parts List

10 . . . central processing unit
11,13 . . . data link system
12,14,16,18,20,22 . . . input devices
32,34,36,38,40,42 . . . output devices
44 . . . server
100 . . . prestored digital image
102,104,106 . . . locations
108,109,110 . . . customer generated images/text
114 . . . combined digital image
119 . . . frame
120 . . . table
122 . . . background
123 . . . wallpaper
124 . . . lower half
126 . . . wall
132 . . . tablecloth
134 . . . chair
136 . . . drapes
138 . . . wood trim
140,150 . . . color frame
152 . . . matte
158 . . . color wheel chart
160,162,164 . . . lines
166 . . . center-line

We claim:

1. A method of combining at least one customer generated digital image and/or text with at least one prestored digital image to form a merged image to be displayed in association with another item, comprising the steps of:
   a) selecting a prestored digital image, the prestored digital images having one or more predetermined locations where a customer generated digital image and/or text may be placed;
   b) obtaining at least one customer generated digital image in digital form;
   c) obtaining a design characteristic from an item to be displayed apart from and in association with the merged image; d) modifying one of the customer generated digital image or the prestored image in accordance with said design characteristic so as to form a first modified digital image; and
   e) combining the first modified digital image with the other of the selected prestored digital image or customer generated digital image so as to form a newly merged digital image from which the merged image may be formed and displayed apart from and in association with said item.

2. The method according to claim 1 further comprising the steps of:
   a) providing at least one output means for printing, displaying, transmitting, or storing of an image; and
   b) forwarding said newly merged digital image to said output means for printing, displaying, transmitting, or storing said merged image.

3. The method according to claim 1 wherein said design characteristic comprises the color of said item.

4. The method according to claim 1 wherein the design characteristic comprises a design pattern.

5. The method according to claim 1 wherein said item comprises wallpaper.

6. The method according to claim 1 wherein said item comprises furniture.

7. The method according to claim 1 wherein said item comprises a picture matte which is to be used to surround said merged image.

8. The method according to claim 1 wherein said design item comprises a picture frame in which the merged image is to be placed.

9. A method of combining at least one customer generated digital image and/or text with a prestored digital image to form a merged image to be displayed, comprising the steps of:

a) selecting a prestored digital image, the selected prestored digital image having one or more predetermined locations where a customer generated digital image and/or text may be placed;

b) obtaining at least one customer generated digital image in digital form;

c) selecting an item which is to be displayed apart from and in association with a merged digital image comprising the combination of the selected prestored digital image and said customer generated digital image;

d) combining the selected prestored digital image with said customer generated digital image so as to form said merged digital image for display in association with said item;

e) analyzing the color of said customer generated digital image and/or said selected prestored digital image and/or said merged digital image to determine a color component or design characteristic thereof; and f) automatically selecting the color or design characteristic of said item to match or complement the determined color component or design characteristic of said customer generated digital image, said selected prestored digital image, and/or said merged image.

10. The method according to claim 9 wherein:

said analyzing step comprises analyzing said customer generated digital image and said selected prestored digital image to produce a first color value; and said item selecting step comprises selecting said item to be displayed with said merged image in accordance with a predetermined relationship to said first color value.

11. The method according to claim 10 wherein said color selecting step uses a color wheel chart to form the predetermined relationship with the color of said item.

12. The method according to claim 11 wherein said color selecting step comprises selecting a similar color of different color intensity than the color intensity of the color of said item using the color wheel chart.

13. The method according to claim 11 wherein said color selecting step comprises selecting a contrasting color of similar color intensity than the color intensity of the color of said item using the color wheel chart.

14. The method according to claim 9 wherein said item comprises a picture matte or frame.

* * * * *